United States Patent
Lu

(10) Patent No.: US 7,945,127 B2
(45) Date of Patent: May 17, 2011

(54) ELECTRICALLY PLUGGABLE OPTICAL INTERCONNECT

(75) Inventor: Daoqiang Lu, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 644 days.

(21) Appl. No.: 11/902,195

(22) Filed: Sep. 19, 2007

(65) Prior Publication Data

US 2009/0074350 A1    Mar. 19, 2009

(51) Int. Cl.
*G02B 6/12*  (2006.01)
(52) U.S. Cl. .............................. 385/14; 385/39; 385/129
(58) Field of Classification Search .................... 385/14, 385/31, 39, 129
See application file for complete search history.

(56) References Cited

U.S. PATENT DOCUMENTS

| | | | |
|---|---|---|---|
| 5,125,054 A * | 6/1992 | Ackley et al. | 385/49 |
| 7,751,660 B2 * | 7/2010 | Ueno et al. | 385/14 |
| 2004/0001661 A1 * | 1/2004 | Iwaki et al. | 385/14 |
| 2005/0046011 A1 * | 3/2005 | Chen et al. | 257/705 |
| 2005/0220393 A1 * | 10/2005 | Riester et al. | 385/15 |
| 2007/0104416 A1 * | 5/2007 | Shimizu et al. | 385/14 |
| 2009/0310905 A1 * | 12/2009 | Riester et al. | 385/14 |

OTHER PUBLICATIONS

H.F. Kuo et al, "InP/InGaAsP MQW thin film edge emitting lasers for embedded waveguide chip to chip optical interconnections", The 16th Annual Meeting of Lasers and Electro-Optics Society, 2003. vol. 1. pp. 63-64. 2003.

* cited by examiner

*Primary Examiner* — Sarah Hahm
(74) *Attorney, Agent, or Firm* — Schwabe, Williamson & Wyatt, P.C.

(57) ABSTRACT

An optical interconnect is provided which may allow flexible high-bandwidth interconnection between chips, eliminate the need for optical alignment between the optoelectrical (OE) die and waveguide during assembly because the OE die is at least partially embedded inside the waveguide (lower cladding layer, upper cladding layer, and core layer), eliminate the need for handling the optical interconnect at OEM, and not impact current substrate and motherboard technology.

9 Claims, 4 Drawing Sheets

ELECTRICALLY PLUGGABLE OPTICAL INTERCONNECT

FIELD OF THE INVENTION

The present invention generally relates to an optical interconnect. In particular, the present invention relates to an optical interconnect which provides a high-speed connection between electrical circuits on different substrates

BACKGROUND OF THE INVENTION

As input/output (I/O) speeds continue to increase, the electrical interconnects currently used to connect circuit elements will run out of bandwidth. Optical interconnects have been proposed as a potential solution to this problem since optical interconnects are capable of providing very high total bandwidth. However, current optical interconnect solutions are inadequate for many reasons.

FIG. 1 shows an example of an optical interconnect. In FIG. 1 a control chip 110 is electrically connected to an optoelectrical (OE) die 120. An OE die is an interface between electrical signals and optical signals OE die 120 either converts electrical signals from the control chip to optical signals or converts optical signal from the waveguide to electrical signals. The optical signals are transmitted from the OE die's optical source (such as a laser) through planar waveguide 130 which is partially buried in substrate 140. The optical waveguide carries the optical signals to connector 150. Although the optical interconnect of FIG. 1 is operable, there are many problems with this approach:
 1. The fabrication and assembly of planar waveguide 130 and connector 150 are not High Volume Manufacturing (HVM) compatible;
 2. A trench must be made in the substrate so that the planar waveguide can fit under the OE die; and
 3. Alignment between the OE die and planar waveguide is currently done by semi-active alignment Other problems with current optical interconnect methodologies include:
 1. Optical alignment between the OE die and the waveguide is a big challenge;
 2. Handling of the optical interconnect is considered a major concern from Original Equipment Manufacturers (OEM).

There has been some research on embedding an OE die inside the core of a waveguide where the waveguide is embedded inside a motherboard or a substrate. For example, embedding a thin edge emitting laser into an organic substrate has been demonstrated before. However this type of approach has too large of an impact on current motherboard and substrate technology and is too costly.

Thus, there is a need for an optical interconnect which, for example:
 1. Provides flexible high-bandwidth interconnect between chips (such as a CPU and a Memory Controller Hub (MCH));
 2. Eliminates the need for optical alignment between the OE die and waveguide during assembly because the OE die is at least partially embedded inside the waveguide (lower cladding layer, upper cladding layer, and core layer);
 3. Eliminates the need for handling the optical interconnect at OEM; and
 4. Does not impact current substrate and motherboard technology.

BRIEF DESCRIPTION OF THE DRAWINGS

Embodiments of the invention will be understood and appreciated more fully from the following detailed description in conjunction with the drawings in which like reference numerals indicate corresponding, analogous or similar elements, and in which.

DESCRIPTION OF THE PREFERRED EMBODIMENT

In the following description, various aspects of the present invention will be described. For purposes of explanation, specific configurations and details are set forth in order to provide a thorough understanding of the present invention. However, it will be apparent to one skilled in the art that the present invention may be practiced without the specific details presented herein. Furthermore, well-known features may be omitted or simplified in order not to obscure the present invention Various examples are given throughout this description. These are merely descriptions of specific embodiments of the invention. The scope of the invention is not limited to the examples given.

In an embodiment of the present invention, thin optoelectronics dies may be embedded inside a core of a free-standing optical waveguide The OE dies may be for example an edge emitting laser, a Vertical-Cavity Surface-Emitting Laser (VC-SEL), and the like or a detector for a laser. The waveguide with the embedded OE dies may then be used as for example a separable high speed link capable of providing a high speed connection between any two chips or packages. In an embodiment of the present invention the OE dies are at least partially embedded in the waveguide. A waveguide may be defined by an upper cladding layer, a lower cladding layer and a core layer disposed in between the two cladding layers, for example.

An optical waveguide according to one embodiment may include a lower cladding layer, an upper cladding layer, and a core layer disposed between the lower and upper layer, where the core has a higher index of refraction than the lower layer and the upper layer. The waveguide may include a first optical die having an optical source to transmit an optical signal into the core layer, where the first optical die is as at least partially embedded in one end of the waveguide. The waveguide may further include a second optical die having a detector for the optical signal, where the second optical die is at least partially embedded in waveguide.

In an embodiment of the present invention using thin film edge emitting lasers and thin film edge receiving detectors, fabrication of the waveguide with embedded optoelectronics dies may include the following operations, but may include other operations. As is apparent to those skilled in the art, some of the following operations may not be necessary for the fabrication of an operable waveguide and may instead be included since a better waveguide results Additionally, although separated into different, ordered operations some of the operations may be performed out of order, condensed into a single operation, or split into several operations.

Figure 2:
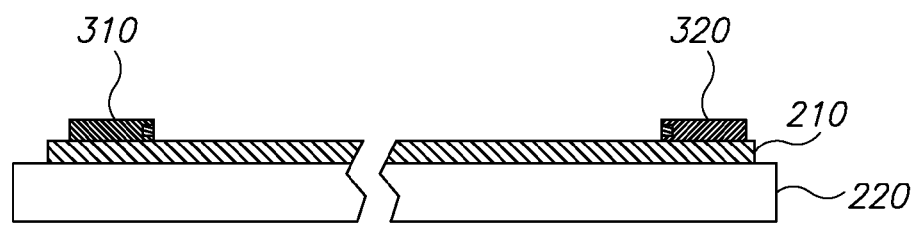
FIGS. 2-7 show a series of operations in fabricating an embodiment of the present invention employing thin film edge emitting lasers.
Figure 3:
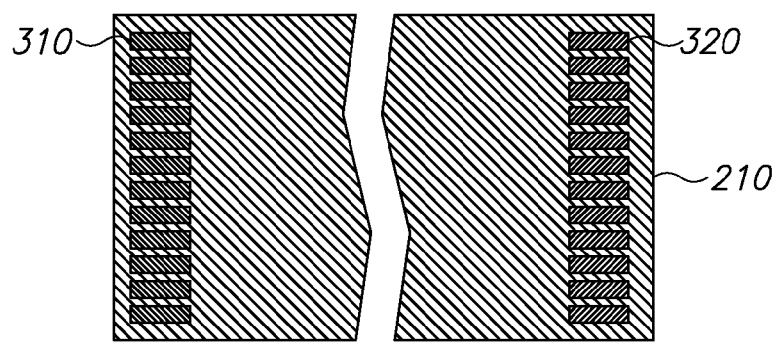
Figure 4:
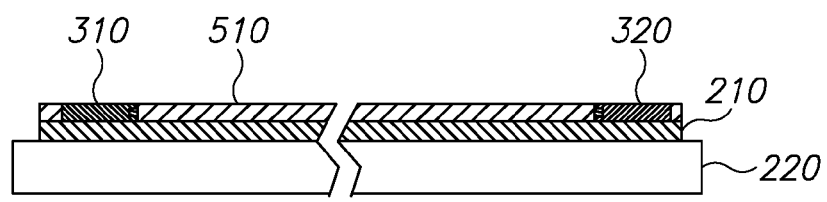
Figure 5:
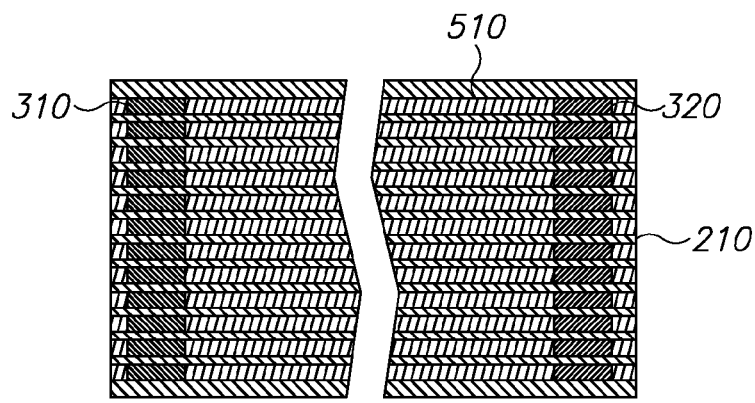

An embodiment of operation 1 is illustrated in FIG. 2. A lower cladding layer 210 may be coated on to a releasable support substrate 220. The releasable support substrate may be for example a Teflon™ non-stick surface coated substrate or the like. The releasable support substrate may alternatively be a tape or film cladding layer. Thin OE dies are precisely placed on the lower cladding layer. The OE dies may be less than 50 μm tall. Alternately, the OE dies may be between 8 μm and 100 μm tall. The cross-section of the finished waveguide may thus be between 8 μm×8 μm to 100 μm×100 μm. On one side of the lower cladding layer thin film edge emitting lasers 310 are placed and on the opposite side of the lower cladding layer thin film edge receiving detectors 320 are placed. As shown in FIG. 3, the thin film edge emitting lasers are precisely placed opposite and distal to the thin film edge receiving detectors such that one faces the other. Other dimensions may be used An embodiment of operation 2 is illustrated in FIG. 4. The lower cladding layer is coated with a photo-definable core layer 510. The photo-definable core layer has a higher refractive index than the cladding layer. As shown in FIG. 5, the core layer is then photo-defined to strip away the excess layer and create separate cores for each OE die pair. Other methods to create separate cores are possible other than photo-defining.

Figure 6:
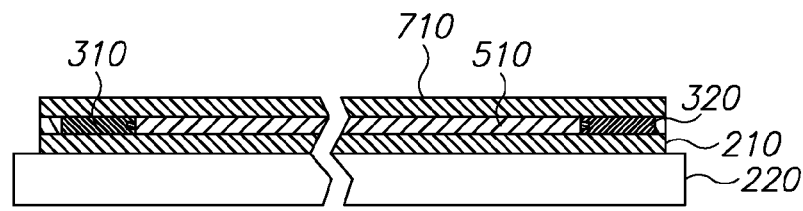

An embodiment of operation 3 is illustrated in FIG. 6. The lower cladding layer and photo-definable core layer are coated with an upper cladding layer 710. The upper cladding layer may have the same index of refraction as the lower cladding layer. The upper cladding layer may be photo definable or non-photo-definable.

Figure 7:
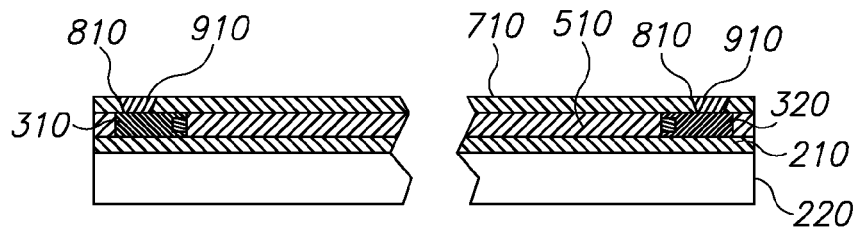

An embodiment of operation 4 is illustrated in FIG. 7. Form vias 810 in the upper cladding layer to expose the metal pads on the embedded OE dies If the upper cladding layer is photo-definable, the vias may be formed by photo-defining. Alternately, laser drilling may be used. Fill the vias with copper 910 thereby creating an accessible electrical connection to the metal pads on the OE dies. Alternatively, other conductive materials may be used other than copper In an alternate embodiment, when the upper cladding layer is coated on top of the lower cladding later and the core layer, it is not coated on top of the OE dies. In such an embodiment is may not be necessary to form vias. In such an embodiment, electrical contact may be made directly to the metal contacts on the OE die.

In an embodiment of operation 5, the lower cladding layer, core layer, and upper cladding layer are diced into discrete optical interconnects. The discrete optical interconnect may contain one or more waveguides each having a pair of OE dies embedded therein. Optical interconnects may also be referred to as waveguide arrays The waveguide arrays may then be released from the support substrate.

Embodiments of the current invention may be used in a variety of ways.

Figure 8:
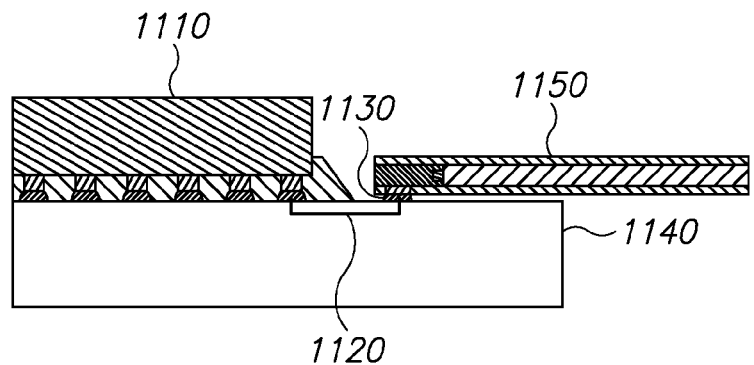
FIG. 8 shows an embodiment of the present invention in which an optical waveguide is connected to a controller chip by a solder joint connected to the controller chip by a high-speed transmission line.
Figure 9:
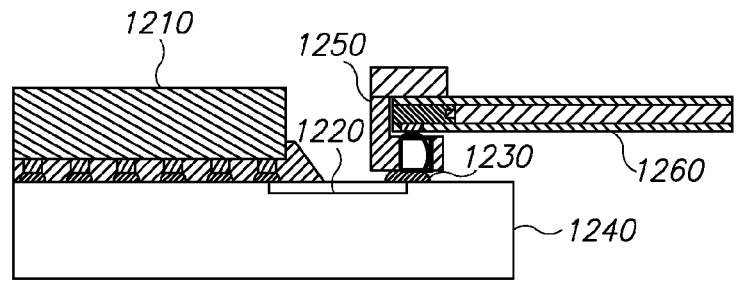
FIG. 9 shows an embodiment of the present invention in which an optical waveguide is separably connected to a controller chip by a connector connected to the controller chip by a high-speed transmission line.

FIG. 8 illustrates an embodiment of the present invention in which a control chip 1110 may have an electrical connection 1120 to a solder joint 1130 on a substrate 1140. A waveguide array 1150 may be soldered to the solder joint on to the substrate thereby providing the control chip with a high-bandwidth optical interconnect. In such an embodiment the waveguide array is soldered to the substrate for a non-separable connection FIG. 9 illustrates an embodiment of the present invention in which a control chip 1210 may have an electrical connection 1220 (for example, using a high-speed transmission line) to a solder joint 1230 on a substrate 1240. A connector 1250 may be soldered to the solder joint on to the substrate. A waveguide array 1260 may be inserted into the connector thereby providing the control chip with a high-bandwidth optical interconnect. In such an embodiment the waveguide array is inserted into the connector for a separable connection.

Figure 10:
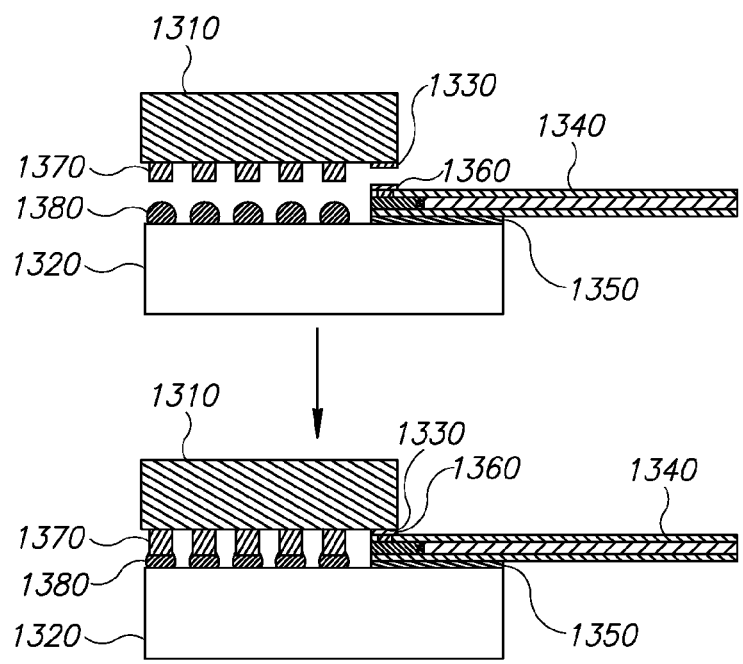
FIG. 10 shows an embodiment of the present invention in which an optical waveguide is directly connected to a controller chip by a solder joint.

FIG. 10 illustrates an embodiment of the present invention in which a control chip 1310 may have several of its I/Os 1370 soldered directly to various electrical connections 1380 on a substrate 1320. At least one of the I/Os 1330 may instead be soldered using solder paste 1360 directly to the via of a waveguide array 1340 which is connected to the substrate by an adhesive layer 1350. In an alternative embodiment I/O 1330 may instead be soldered using solder paste directly to the electrical contact of the OE die in waveguide array 1340. In the embodiment shown in FIG. 10, the optical interconnect provides the highest speed because of the extremely short connection between the control chip and the OE die.

Figure 11:
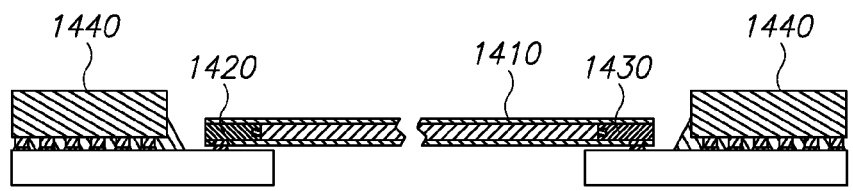
FIG. 11 shows an embodiment of an optical waveguide with embedded thin lasers and detectors being used as a high speed link between two packages.

FIG. 11 shows an embodiment of a waveguide 1410 with embedded thin lasers 1420 and detectors 1430 being used as a high speed link between two packages 1440.

In an embodiment of the present invention using top emitting VCSEL lasers and top receiving detectors, fabrication of the waveguide with embedded optoelectronics dies may include the following operations, but may include other operations. As is apparent to those skilled in the art, some of the following operations may not be necessary for the fabrication of an operable waveguide and may instead be included since a better waveguide results. Additionally, although separated into different, ordered operations some of the operations may be performed out of order, condensed into a single operation, or split into several operations.

Figure 12:
FIGS. 12-15 show a series of operations in fabricating an embodiment of the present invention employing vertical-cavity surface-emitting lasers.
Figure 13:
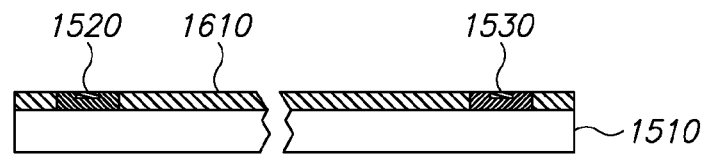

An embodiment of operation 1 is illustrated in FIG. 12. Thin OE dies are precisely placed on a releasable support substrate 1510. The releasable support substrate may be a Teflon™ non-stick surface coated substrate or the like. The OE dies may be less than 50 μm tall. Alternately, the OE dies may be between 8 μm and 100 μm tall. The cross-section of the finished waveguide may thus be between 8 μm×8 μm to 100 μm×100 μm. On one side of the support substrate, VCSEL lasers 1520 are placed and on the opposite side of the support substrate top receiving detectors 1530 are placed. The VCSEL lasers are precisely placed opposite and distal to the top receiving detectors such that one faces the other. Other dimensions may be used.

Figure 1:
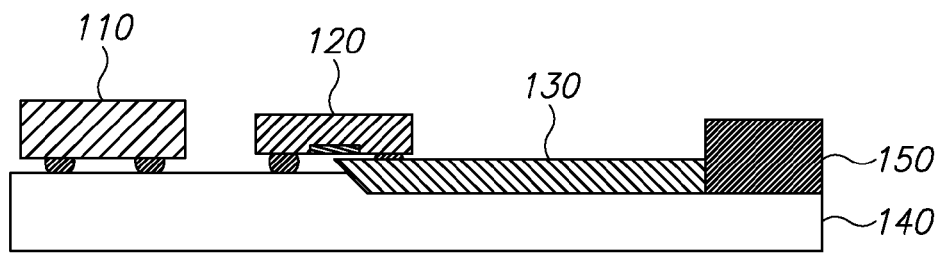
FIG. 1 shows an example of an optical interconnect.

An embodiment of operation 2 is illustrated in FIG. 1.3. A lower cladding layer 1610 is coated on to the releasable support substrate. The releasable support substrate may alternatively be a tape or film cladding layer.

Figure 14:
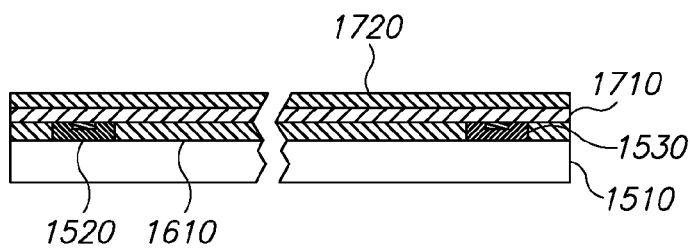

An embodiment of operation 3 is illustrated in FIG. 14. The lower cladding layer is coated with a photo-definable core layer 1710. The photo-definable core layer has a higher refractive index than the cladding layer The core layer is then photo-defined to strip away the excess layer and create separate cores for each OE die pair. Other methods to create separate cores are possible other than photo-defining. The lower cladding layer and photo-definable core layer are coated with an upper cladding layer 1720. The upper cladding layer may have the same index of refraction as the lower cladding layer. The upper cladding layer may be photo definable or non-photo-definable.

Figure 15:
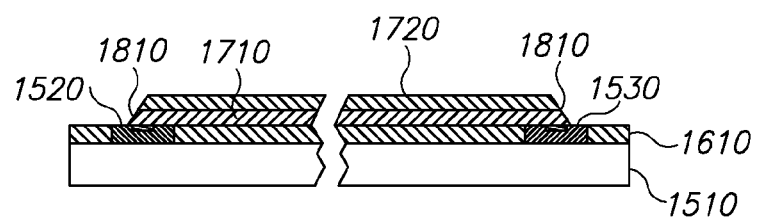

An embodiment of operation 4 is illustrated in FIG. 15. The edges above the VCSEL laser and top receiving detector are formed into 45 degree mirrors 1810 to guide the optical signal. The 45 degree mirrors are formed by laser ablation. Alternately, mechanical sawing or photo defining may be used.

In an embodiment of operation 6, the lower cladding layer, core layer, and upper cladding layer are diced into discrete optical interconnects. The discrete optical interconnect may contain one or more waveguides each having a pair of OE dies embedded therein. Optical interconnects may also be referred to as waveguide arrays. The waveguide arrays may then be released from the support substrate.

Figure 16:
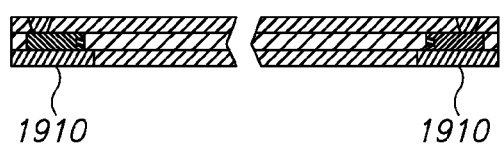
FIG. 16 shows an embodiment of optical waveguides having a heat spreader
Figure 16:
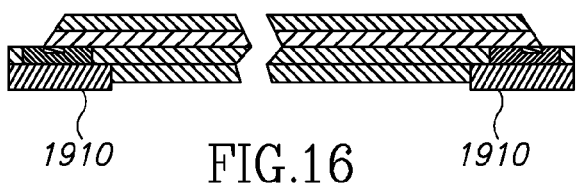

FIG. 16 illustrated an embodiment of the present invention in which a heat spreader 1910 may be attached to the OE die to dissipate heat The heat spreader may be added to the waveguide in one of the first operations of the waveguide fabrication before the lower cladding layer is coated. Alternately, the heat spreader may be added to the waveguide in one of the final operations of the waveguide fabrication by removing the waveguide from the substrate, removing a portion of the lower cladding layer, and adding the heat spreader.

It will be appreciated by persons skilled in the art that the present invention is not limited to what has been particularly shown and described hereinabove. Rather the scope of the present invention is defined only by the claims, which follow:

What is claimed is:

1. An optical interconnect, comprising:
   a waveguide for separable insertion into a connector and electrically connected thereto, comprising:
   i. a lower cladding layer;
   ii. an upper cladding layer;
   iii. a core layer disposed between said lower cladding layer and said upper cladding layer, wherein said core layer has a higher index of refraction than said lower cladding layer and said upper cladding layer;
   iv. a first optical die comprising a vertical-cavity surface-emitting laser to transmit an optical signal into said core layer;
   v. a second optical die comprising a top receiving detector for detecting said optical signal, wherein said first optical die and said second optical die are at least partially embedded in said waveguide, and wherein said second optical die is distal to said first optical die; and
   vi. a 45-degree minor formed in said upper cladding layer and said core layer.

2. The optical interconnect of claim 1, wherein said core layer is photo-definable.

3. The optical interconnect of claim 1, wherein said upper cladding layer is photo-definable.

4. The optical interconnect of claim 1, comprising a via formed in said upper cladding layer for allowing electrical contact with said first optical die.

5. The optical interconnect of claim 1, comprising a heat spreader operably attached to said first optical die for dissipating heat from said first optical die.

6. A communication system, comprising:
   a. a controller;
   b. a connector electrically connected to the controller; and
   c. an optical interconnect operably connected to said connector and separably insertable therein, comprising:
      a waveguide, comprising:
      1. a lower cladding layer;
      2. an upper cladding layer;
      3. a core layer disposed between said lower cladding layer and said upper cladding layer, wherein said core layer has a higher index of refraction than said lower cladding layer and said upper cladding layer;
      4. a first optical die comprising a vertical-cavity surface-emitting laser to transmit an optical signal into said core layer;
      5. a second optical die comprising a top receiving detector for detecting said optical signal, wherein said first optical die and said second optical die are at least partially embedded in said waveguide, and wherein said second optical die is distal to said first optical die; and
      6. a 45-degree mirror formed in said upper cladding layer and said core layer.

7. The communication system of claim 6, comprising a via formed in said upper cladding layer for allowing electrical contact with said first optical die.

8. The communication system of claim 6, wherein said optical interconnect is connected to said controller by a solder joint connected to said controller by a high-speed transmission line.

9. The communication system of claim 6, wherein said connector is connected to said controller by a high-speed transmission line.

* * * * *